United States Patent
Chiocchio et al.

[11] Patent Number: 6,047,736
[45] Date of Patent: Apr. 11, 2000

[54] WASTE WATER DISPOSAL SYSTEM FOR A CAMPING SITE

[76] Inventors: Michael Chiocchio; Ralph Chiocchio, both of 33 Victoria Dr., Branford, Conn. 06405

[21] Appl. No.: 09/177,076

[22] Filed: Oct. 22, 1998

[51] Int. Cl.[7] .................................................. B60R 15/04
[52] U.S. Cl. ............................................ 137/899; 4/321
[58] Field of Search ................................ 137/899; 4/321, 4/323

[56] References Cited

U.S. PATENT DOCUMENTS

| | | |
|---|---|---|
| 211,889 | 2/1879 | Daley . |
| 978,344 | 12/1910 | Wirt . |
| 1,337,438 | 4/1920 | Carlson . |
| 1,430,698 | 10/1922 | Stephenson . |
| 2,013,358 | 9/1935 | Osborne . |
| 2,457,742 | 12/1948 | Shoha . |
| 2,571,601 | 10/1951 | Neal . |
| 2,952,468 | 9/1960 | Albee . |
| 2,999,247 | 9/1961 | Kulka ........................................ 4/478 |
| 3,263,865 | 8/1966 | Kachnik . |
| 3,327,323 | 6/1967 | Miller . |
| 3,463,358 | 8/1969 | Wenzler . |
| 3,556,350 | 1/1971 | Hanley . |
| 3,729,033 | 4/1973 | Bayerkohler . |
| 3,992,727 | 11/1976 | Elkins ........................................ 4/311 |
| 4,022,257 | 5/1977 | O'Connell . |
| 4,089,446 | 5/1978 | Logan . |
| 4,676,280 | 6/1987 | Curiel . |
| 4,756,349 | 7/1988 | Atkins . |
| 4,844,121 | 7/1989 | Duke . |
| 5,163,485 | 11/1992 | Hermann . |
| 5,183,086 | 2/1993 | Fanta et al. . |
| 5,230,374 | 7/1993 | Dawson . |
| 5,307,840 | 5/1994 | Shields . |
| 5,358,142 | 10/1994 | Holmes . |

*Primary Examiner*—John Fox
*Attorney, Agent, or Firm*—David Fink

[57] ABSTRACT

A waste water disposal system, comprising a frame including a relatively rigid outer portions and a flexible portion generally extending between the outer portions; a pair of wheels rotatably mounted on the frame and operable for moving the frame by rolling the frame on the wheels; and a flexible and collapsible container positioned on the flexible portion and having an opening for receiving waste water; and a hose connected to the opening of the container for receiving the waste water. The flexible and collapsible container expands as waste water fills the container. The system includes an attaching mechanism operable for connecting the wheels detachably to the frame in an arrangement in which the center of gravity of the frame and flexible portion combined is positioned lower than a coaxial line defined by the centers of the wheels. The frame comprising rotatable sections enabling the frame to be folded to minimize the space it would occupy allowing the system to be folded and stored conveniently. A plastic disposable bag such as used for garbage can be used as the container.

The system according to the invention allows quick and easy assembly and disassembly without tools and can be stored in a space having a height of only about five inches.

9 Claims, 10 Drawing Sheets

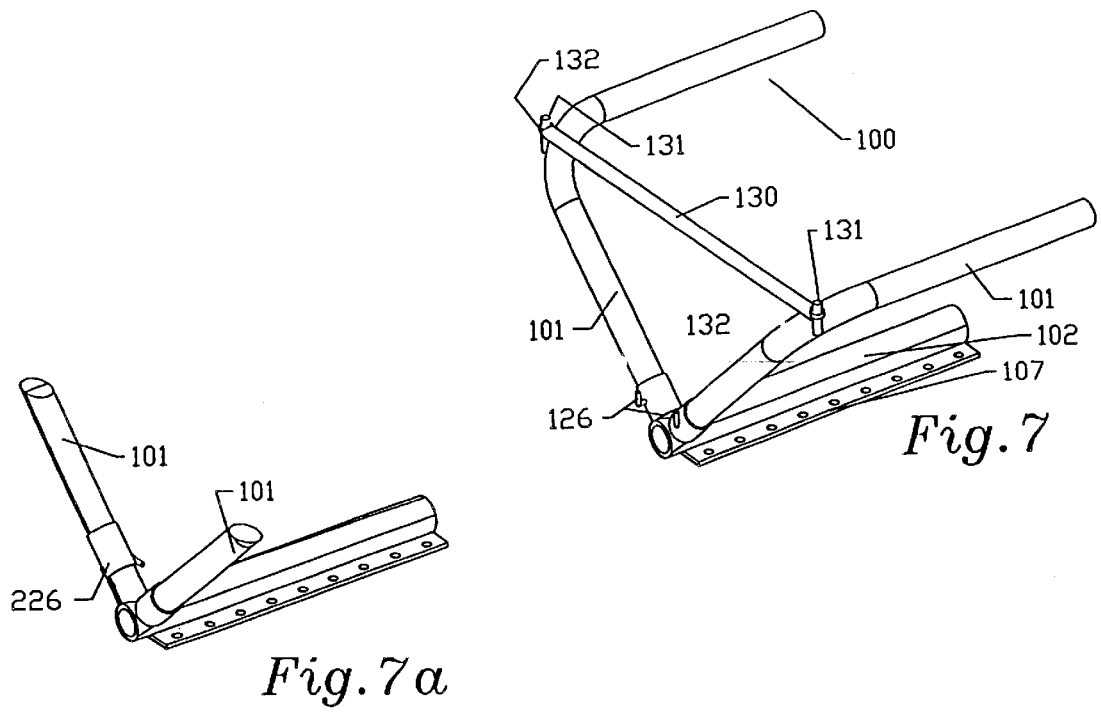
Fig. 7
Fig. 7a
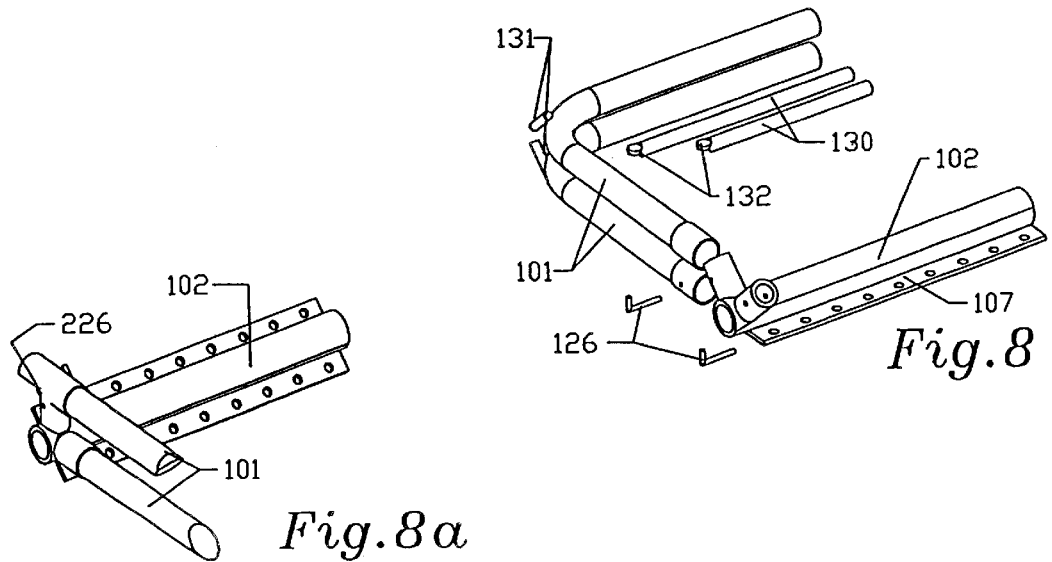
Fig. 8
Fig. 8a

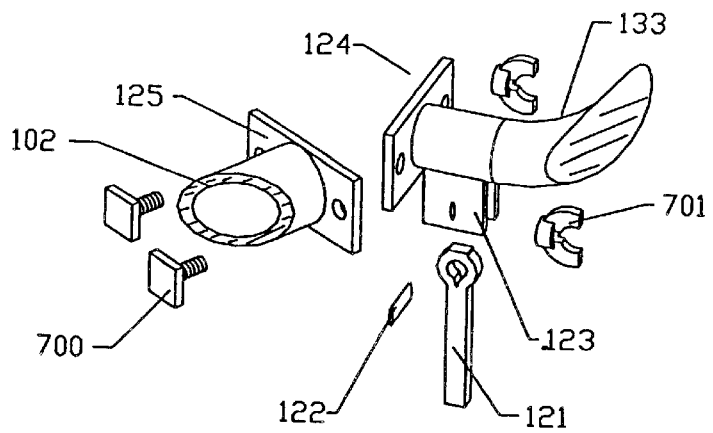
Fig. 12
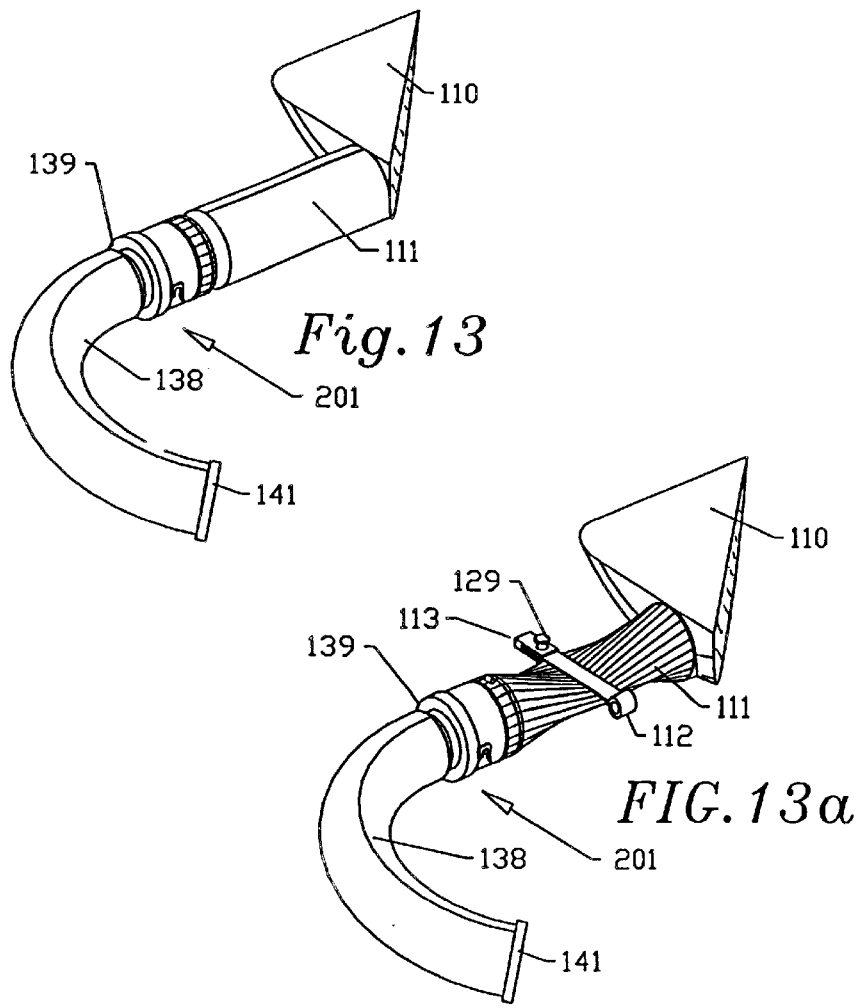
Fig. 13
FIG. 13a

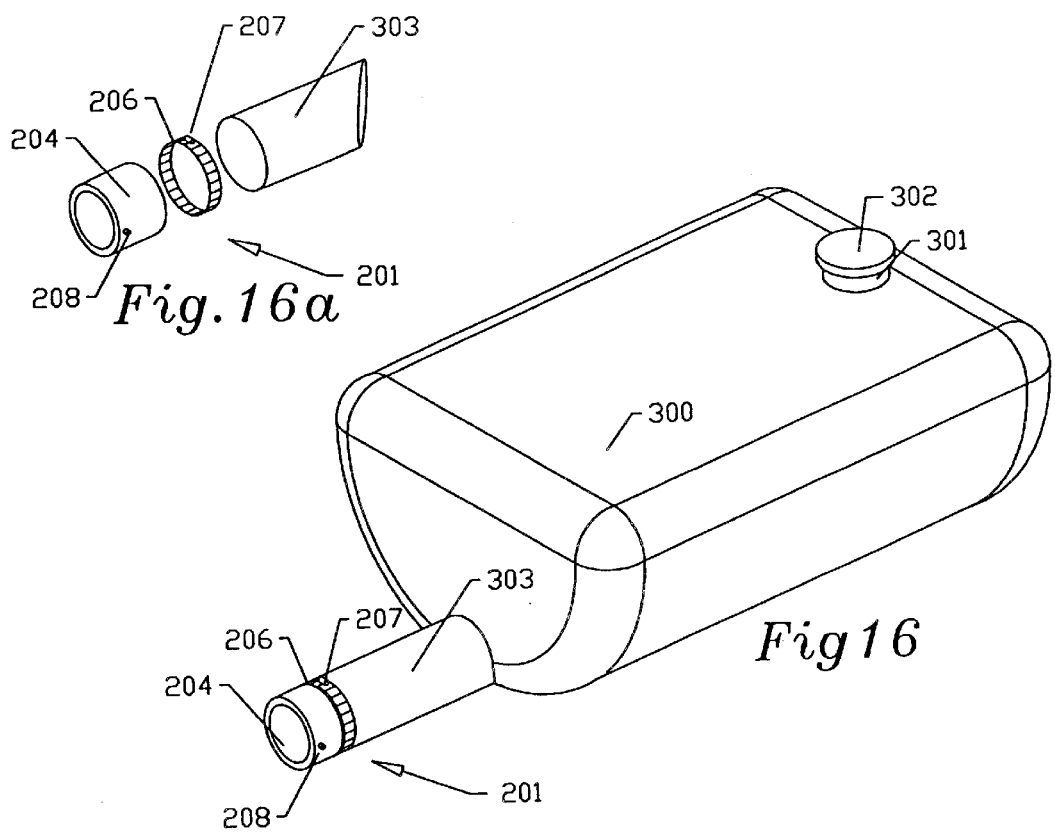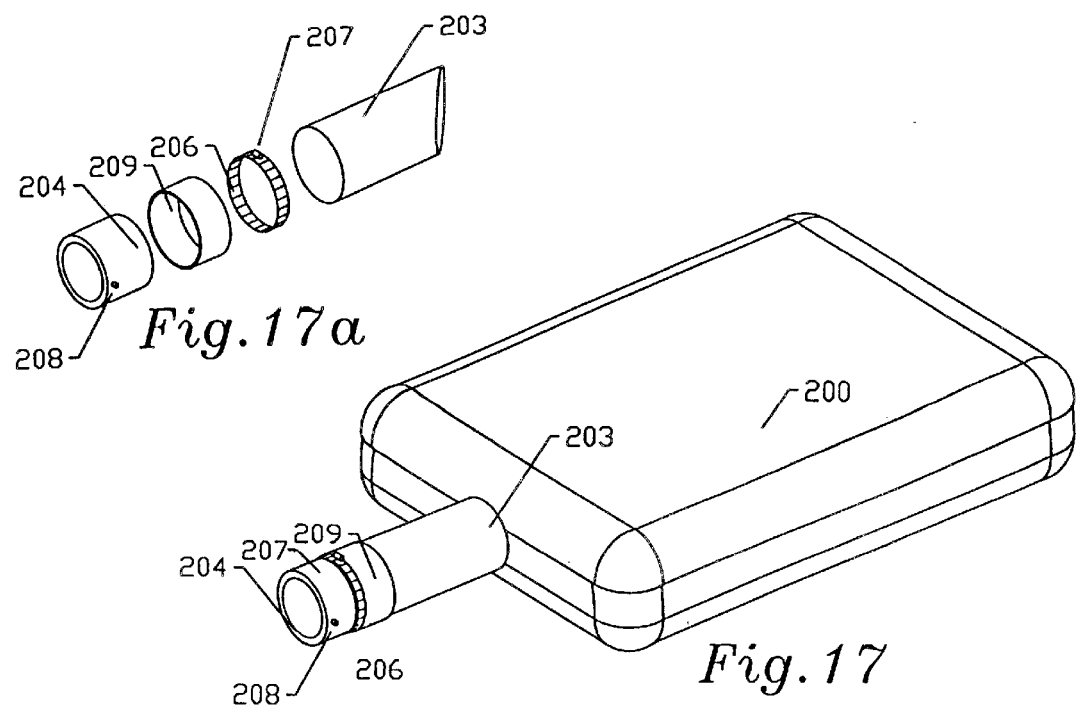

6,047,736

WASTE WATER DISPOSAL SYSTEM FOR A CAMPING SITE

FIELD OF THE INVENTION

The invention relates to a waste water disposal system and particularly to a water disposal system suited for use in a recreational camp site to dispose of waste water.

BACKGROUND OF THE INVENTION

The concern for preserving the environment has brought attention to the disposal of wastewater by campers and people in recreational vehicles. Current laws have imposed a requirement that if a sewer is unavailable, then the waste water must be collected in a container and disposed of at designated sites. Typically, the waste water is collected in a large container such as an over sized bottle. This large container must then be carried to the recreational vehicle or automobile and transported to an approved disposal site. The movement of the container is physically challenging for most people.

U.S. Pat. No. 4,974,899 to Sargent discloses a typical container used to collect toilet waste by being positioned under the commode. The container has an opening which can be sealed at its side to receive wastewater and another sealable opening at its end for releasing the contents. The container must be manually carried from its position under the commode to its disposal location. Furthermore, to transport the container, it might be necessary to actually drive the recreational vehicle over to the disposal site to minimize the physical effort required.

SUMMARY OF THE INVENTION

The present invention overcomes the drawbacks of the prior art by providing a waste water disposal system with a self-contained transportable unit so that it can be moved conveniently without very much physical effort.

The invention further provides an inexpensive arrangement which allows the use of a commercially available liner material to reduce and virtually eliminate the cleaning of the system between uses.

The invention in a broad embodiment relates to a wastewater disposal system, comprising a frame including a relatively rigid outer portions and a flexible portion generally extending between the outer portions. A pair of wheels rotatably mounted on the frame and operable for moving the frame by rolling the frame on the wheels; and a flexible and collapsible container positioned on the flexible portion and having an opening for receiving waste water; and a hose connected to the opening of the container for receiving the waste water. The flexible and collapsible container expands as waste water fills the container. The system also includes an attaching mechanism for connecting the wheels detachably to the frame in an arrangement in which the center of gravity of the frame and flexible portion combined is positioned lower than a coaxial line defined by the centers of the wheels. The frame also comprises rotatable sections enabling the frame to be folded to minimize the space it would occupy so that the system can be folded and stored conveniently.

In another embodiment, the frame also includes a handle for moving the system conveniently manually.

In still another embodiment, the frame also includes a handle which is removable and replaceable with a hitching device operable to be hitched to a vehicle.

In yet another embodiment, the container also includes another opening which can be capped in a position convenient for cleaning the container, preferably at a mid-position of the container.

The invention in another broad embodiment relates to a wastewater disposal system, comprising a frame including a relatively rigid outer portions and a flexible portion generally extending between the outer portions. A pair of wheels rotatably mounted on a wheel support connected to the frame and operable for moving the frame by rolling the frame on the wheels; and a flexible and collapsible container positioned on the flexible portion and having an opening for receiving waste water; and a hose connected to the opening of the container for receiving the waste water. The flexible and collapsible container expands as waste water fills the container. The system also includes an attaching mechanism for connecting the wheels detachably to the frame in an arrangement in which the center of gravity of the frame and flexible portion combined is positioned lower than a coaxial line defined by the centers of the wheels. The system further comprising an adjusting device for selectively positioning the wheel support longitudinally along the frame. The adjusting device includes a locking device for securing the wheel support in a predetermined position. The frame also comprises rotatable sections enabling the frame to be folded to minimize the space it would occupy so that the system can be folded and stored conveniently.

In a preferred embodiment, the container is lined with a disposal material such as a commercially available 30 gallon plastic bag for convenience in cleaning the container by emptying the container and removing the plastic bag.

BRIEF DESCRIPTION OF THE FIGURES

FIGS. 7 and 8 show details of portions of the frame shown in FIG. 6. before and after the frame is disassembled, respectively.

FIGS. 7a and 8a show an embodiment of the invention with a hinged version of the frame shown in FIG. 6 before and after the frame is collapsed, respectively.

FIG. 12 shows a perspective view with some parts rotated illustrating the connection of the handle and vehicle coupling members to the main frame.

FIG. 13 shows a perspective view of the container neck shown in FIG. 4.

FIG. 13a shows a perspective view of the container neck with a flexible hose and engaged clamp for containing fluids.

FIG. 16 shows an arrangement for the container according to the invention.

FIG. 16a shows an exploded view of a portion of the arrangement shown in FIG. 16.

FIG. 17 shows another arrangement for the container according to the invention.

FIG. 17a shows an exploded view of a portion of the arrangement shown in FIG. 17.

DETAILED DESCRIPTION OF THE PREFERRED EMBODIMENTS

Figure 1:
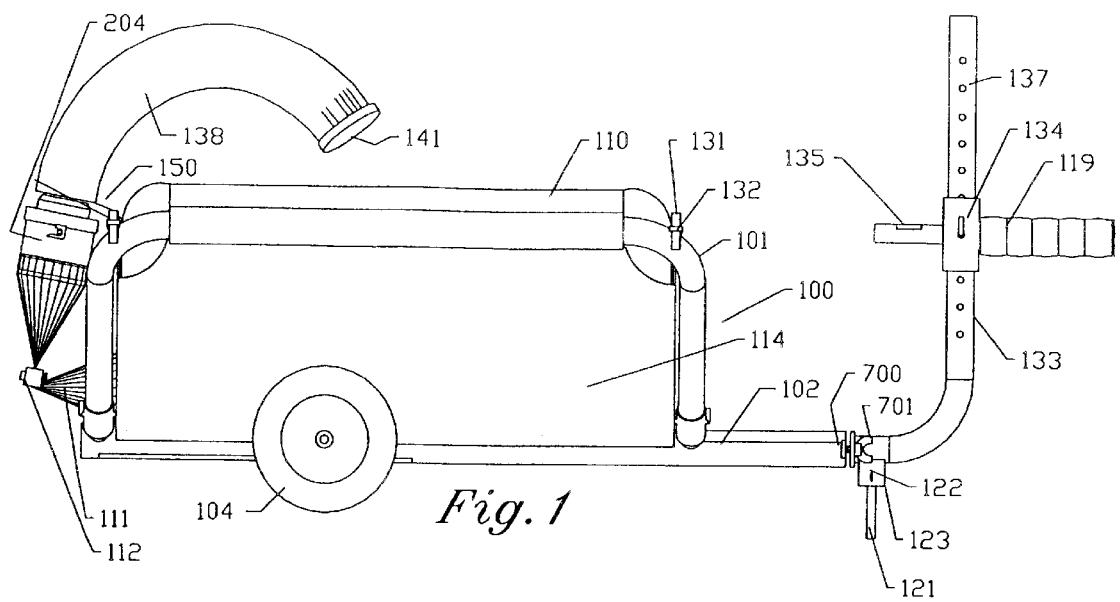
FIG. 1 shows a side view of an embodiment of the system according to the invention.
Figure 2:
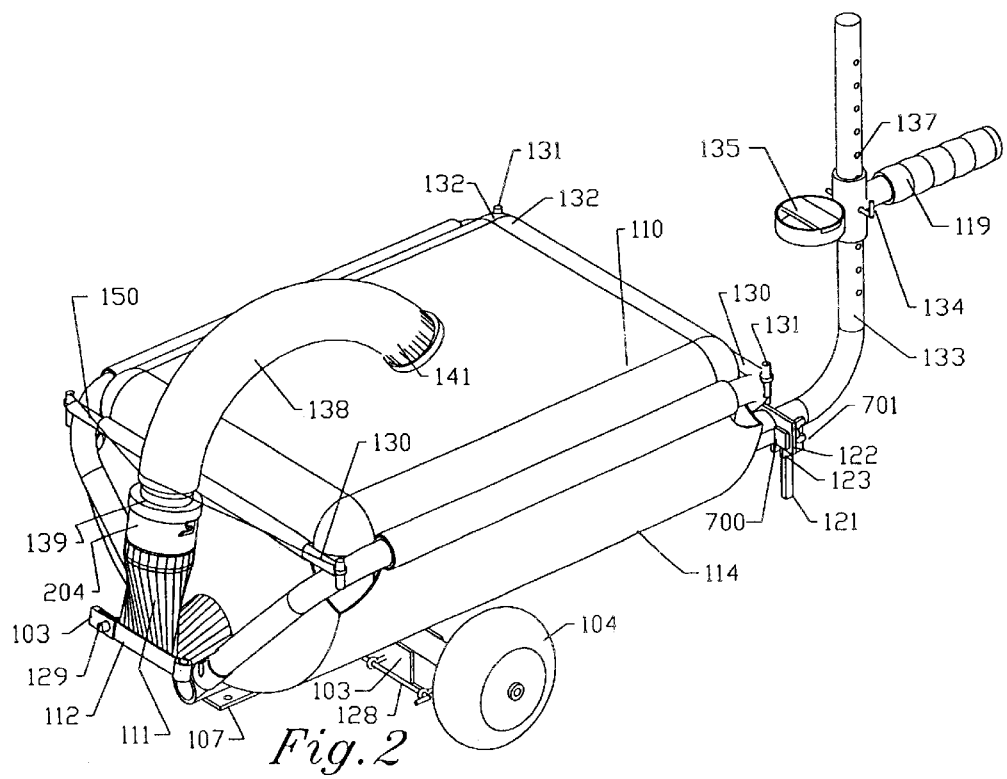
FIG. 2 shows a perspective view of the embodiment of FIG. 1.
Figure 6:
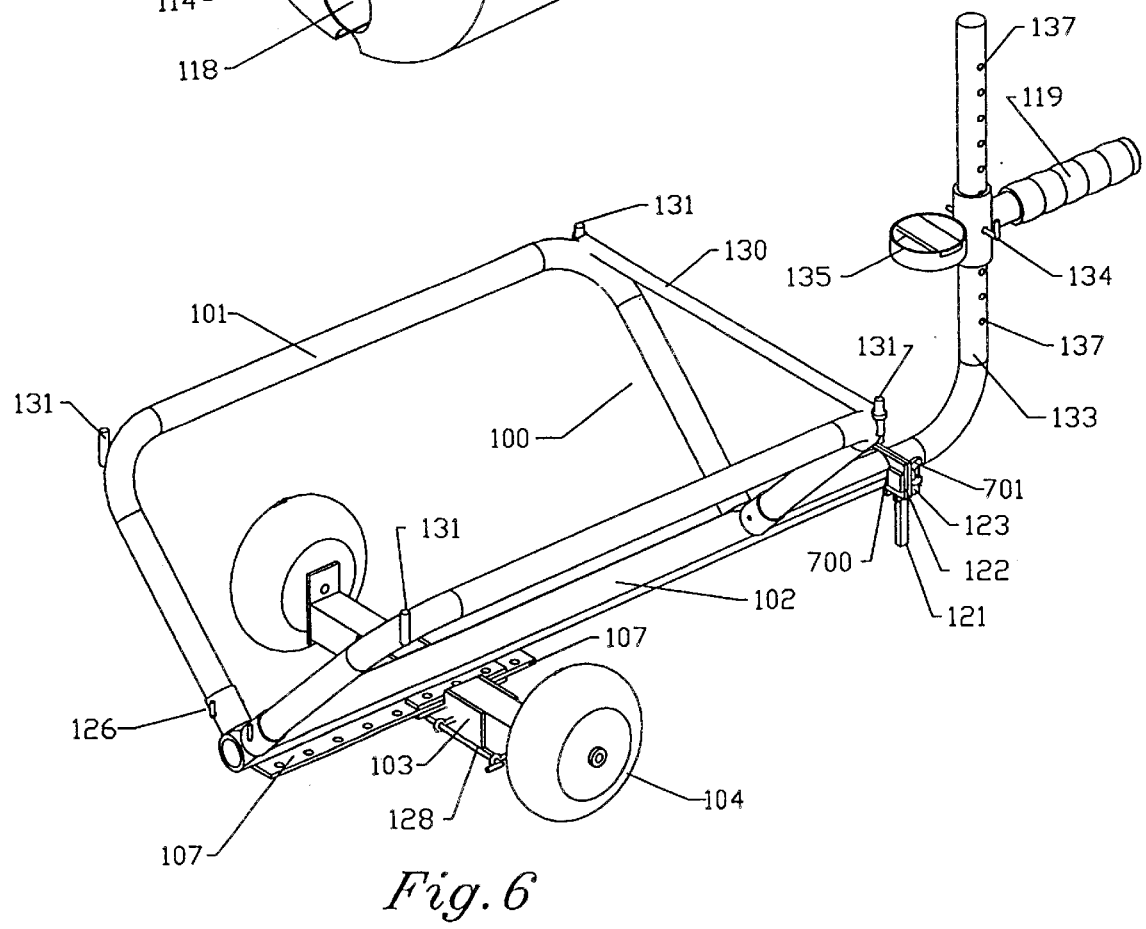
FIG. 6 shows the frame of the embodiment shown in FIG. 2 with the flexible portion removed.

FIGS. 1 and 2 show one embodiment of the invention suitable to be moved conveniently by hand A frame 100 has sides 101 and can be seen in more detail in FIG. 6. The frame 100 also has a member 102 which is connected to frame member 133. Handle 119 is connected to frame member 133 by pin 134.

Figure 3:
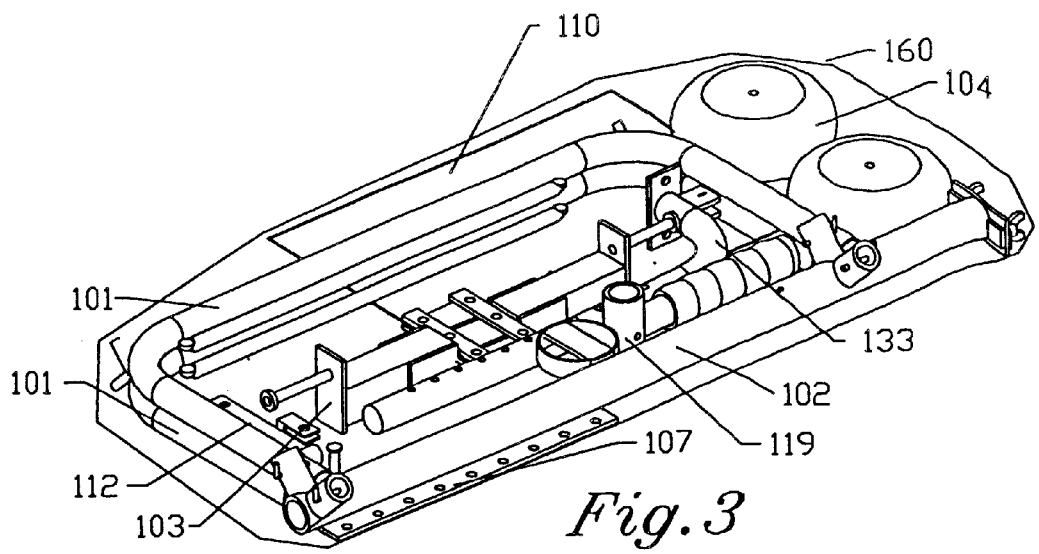
FIG. 3 shows a perspective view of the embodiment shown in FIG. 1 and FIG. 2 collapsed and packaged for storing.

FIG. 3 shows one embodiment of the invention with all parts disabled, folded and packaged for convenience of storage immured in a bag or wrapper 160.

Figure 4:
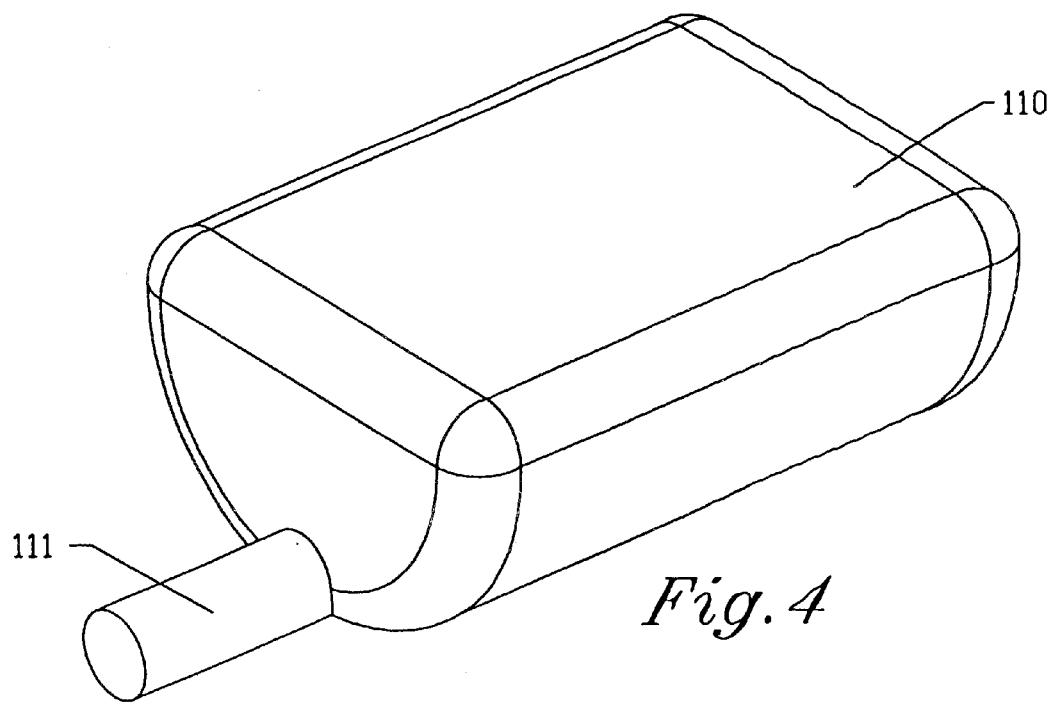
FIG. 4 shows the liquid waste container of the embodiment shown in FIG. 2.

FIG. 4 shows flexible container 110 in an expanded form. The container 110 is a flexible material, which generally is collapsible when it is empty and expands as it is filled with a liquid.

FIG. 3 shows the system in FIGS. 1 and 2 collapsed and folded for convenient storage. The container 110 is also folded and packed. The container 110 includes a collapsible stem portion 111. Also shown in FIG. 13a is where clamp 112 is connected. As seen in FIG. 13a clamp 112 engages stem portion 111.

Figure 5:
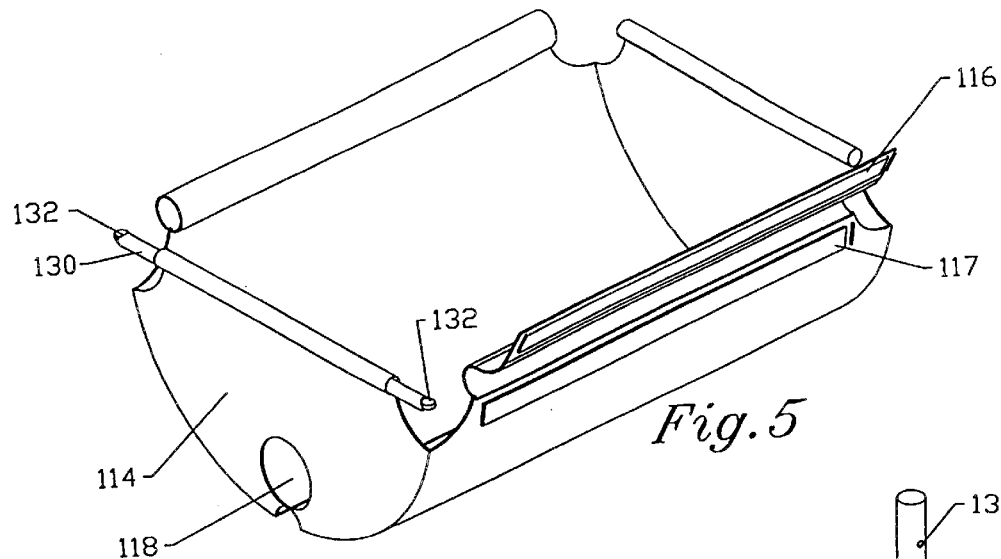
FIG. 5 shows a flexible portion of FIG. 2 in an open position for describing its engagement into the frame.

FIG. 5 shows a flexible support 114, which supports liquid container 110. A flexible material such as nylon can be used for support 114, which is attached to frame 100. An opening 118 shown in FIG. 5 is provided for stem portion 111 shown in FIG. 4. One convenient form of attachment is to use a hook and loop arrangement such as VELCRO (trademark) 116 and 117 shown in FIG. 5. Front and back support of flexible support 114 is provided by rods 130 adjoined to sides 101 of frame 100 as shown in FIG. 7 by pins 131 welded to frame sides 101. Rods 130 have openings at end 132 shown in FIG. 5 to fit over pins 131 shown in FIG. 6. Rods 130 slide into support 114 to add support shown in FIG. 5.

FIG. 6 shows that frame 100 also has a main frame member 102 and front frame member 133. FIG. 12 shows that they are connected by plate 125 at the end of frame member 102. Plate 125 is bolted with bolts 700 and wing nuts 701 to plate 124 at the end of front frame member 133. This portion as well as all other portions of the system is suited for quick and easy assembly and disassembly without the need for tools. FIG. 6 shows a handle 119 is provided for conveniently moving the system. Handle 119 is connected to front frame member 133 by pin 134 and is designed to be easily removed to allow easy storage of system.

FIG. 7 shows rod 130 connected to side frame member 101 without the support 114 and also shows frame sides 101 connected to 102 by pins 126. A frame 100 has sides 101 and can be seen in more detail in FIG. 6.

FIG. 8 shows sides 101 of frame 100 have been removed and that pins 126 hold the two portions of the frame 100 and sides 101 together while allowing disconnection from support 102 for the storing.

FIGS. 7a and 8a show a hinged version of frame 100, which allows for folding at hinge 226. A portion of frame 100 has been folded one with respect to the other on one direction as shown so that the frame 100 retains its shape when the system is in use.

Figure 9:
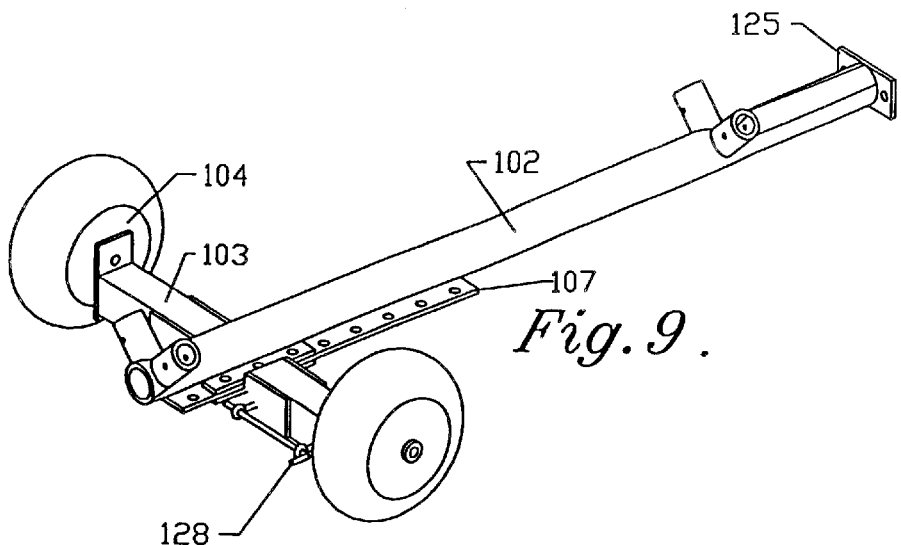
FIG. 9 shows a perspective view of portions of the frame and the wheel support of the embodiment shown in FIG. 2. The wheel support has been positioned in an alternate position showing this embodiment's ability to transfer weight.

FIG. 9 shows wheel support 103 moved to an alternate position to allow for a different weight transfer. This position is more likely when hooded to a vehicle for dumping liquid from unit.

Figure 10:
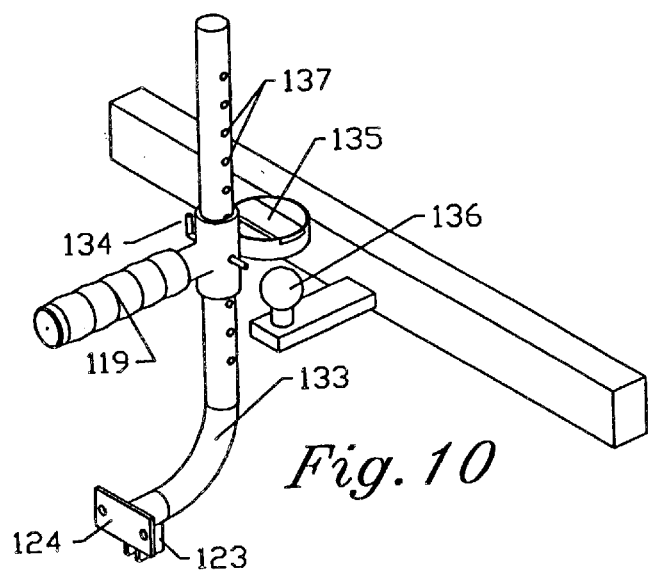
FIG. 10 shows a perspective view of the embodiment in FIG. 2 for connecting the system according to the invention to a vehicle trailer hitch for transportation.

FIG. 10 shows a portion of the system shown in FIG. 2 with handle 119 rotated 180 degrees making trailer adapter 135 available for coupling the system to a vehicle. Member 133 has an adjustable handle 119 which when rotated 180 degrees can be replaced by a trailer adapter 135 held by pin 134. Adapter 135 has a conventional design for being connected to a standard vehicle coupling 136 shown partially in FIG. 10. FIG. 10 shows that trailer adapter 135 is height adjustable and can be made to allow for variations in vehicle heights by selecting the appropriate hole 137 for pin 134.

Figure 11:
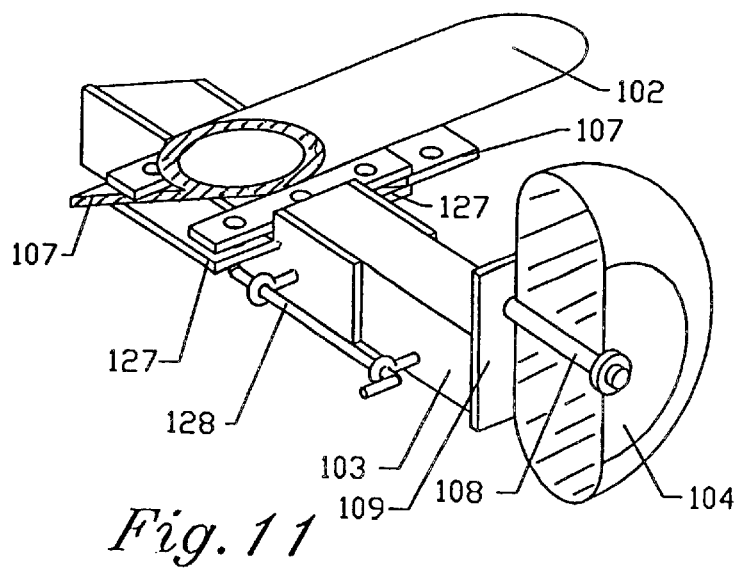
FIG. 11 shows a perspective view with portions removed of the wheel support and the support frame seen in FIGS. 6 and 9.

FIG. 11 shows a perspective view with a portion removed of member 102, wheel support 103 and wheels 104. Wheel support 103 is coupled to member 102 by plates 107, 127 and 127a. Plates 127 and 127a are connected to wheel support 103. Plate 127a is connected to wheel support 103 in a manner that places it directly above plate 127 and aligns some of its holes 127b with some of those of plate 127. The distance between plates 127 and 127a should be enough to allow plate 107 to be positioned between them when not locked into place. Plate 107 is connected to member 102. In a preferred embodiment Plate 107 is welded to member 102. Any other convenient method of securing plate 107 to member 102 may be also be used. Wheel support 103 is adjoined to member 102 by sliding plate 107 in between plates 127 and 127a. Plate 107 is locked into place using locking pin 128a which is connected to rod 128. Rod 128 is threaded through member 229 and is supported by member 229. Member 229 is connected to wheel support 103 and is rotatable around 229a. Plate 107 is locked into place by aligning a hole from plate 107 with aligned holes from plates 127 and 127a and maneuvering rod 128 to position pin 128 into the aligned hole. Once pin 128 is positioned, it should be penetrating plates 107, 127 and 127b. Rod 128 is then secured by maneuvering rod 128 into clip 228.

To detach wheel support 103 from member 102, remove end of rod 128 from clip 228. Raise rod 128 up so that support 229 rotates around 229a. This will cause pin 128a to slide out of hole 127b and free plate 107 from plates 127 and 127a. Now slide wheel support 103 away from the front end of the system until plates 127 and 127a are free of plate 107. Move rod 128 down and engage it with clip 228.

FIG. 11 also shows a detail of the attachment of the wheel 104 to the wheel support 103 using an axle 108 offset from the center of the wheel support 103 by plate 109 to have the center of gravity of container 110 shown in place in FIG. 1 closer to the ground. As indicated the container 110 is a flexible material, which generally is collapsible when it is empty and expands as it is filled with a liquid.

A kick stand 121, shown in FIG. 12, is provided for supporting the end near front frame member 133. The kick stand rotates around bolt 122, which is through bracket 123 on another portion of the front frame member 133.

As indicated, the handle 119 and wheels 104 along with wheel support 103 can be removed to enable even greater convenience in storing the system according to the invention. As seen in FIG. 3, a storage height of only about five inches is needed.

Figure 15:
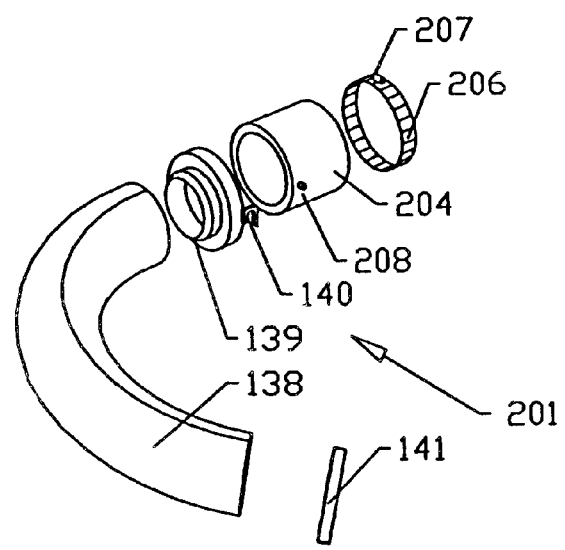
FIG. 15 shows an exploded view of a portion of the arrangement shown in FIG. 13.
Figure 18:
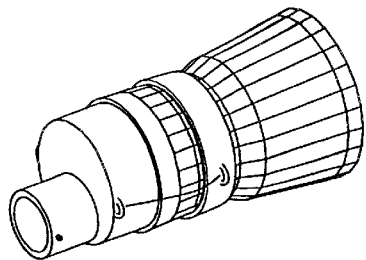
FIG. 18 shows a perspective view of components for one embodiment of the invention.
Figure 18A:
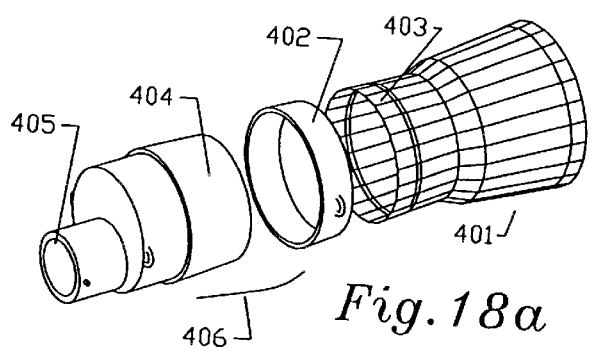
FIG. 18a shows an exploded perspective view of the arrangement shown in FIG. 18.
Figure 18B:
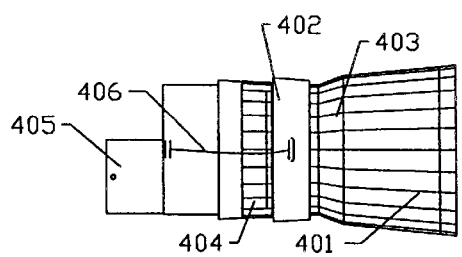
FIG. 18b shows a side view of the arrangement shown in FIG. 18.
Figure 18C:
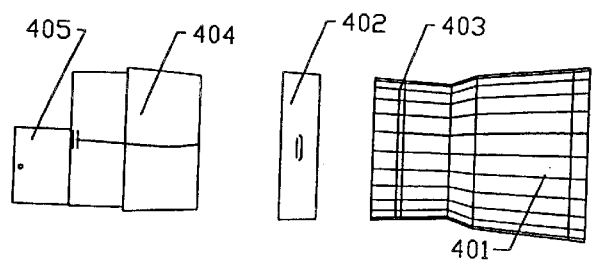
FIG. 18c shows an exploded view of the arrangement shown in FIG. 18.

FIG. 13 shows container 110 connected to a commercially available waste hose 138 by stem portion 111 and coupling arrangement 201. FIG. 15 shows waste hose 138 connected by commercially available connector 139, which connects to element 204 by twisting over pins 208 and held secure by ears 140 of connector 139. Hose portion 138 has a commercially available cap 141 to retain any residual liquid left in hose during movement of the system. Waste hose 138 may be a commercially available hose that allows the invention to be connected to a standard RV waste transfer so liquid could be emptied from RV.

FIG. 13a shows a clamp 112 that when locked by lock 113 and pin 129 onto stem portion 111 prevents liquid from flowing from container 110 into waste hose 138.

Figure 14:
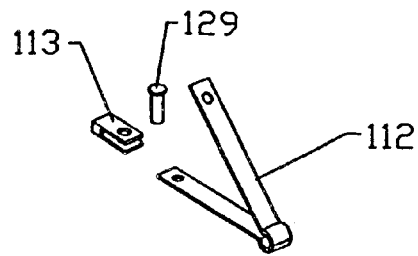
FIG. 14 shows the clamp in FIG. 13a in an open position.
Figure 14A:
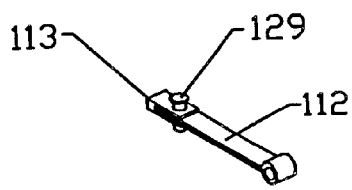
FIG. 14a shows the clamp in FIG. 13a in a locked position.

FIG. 14 and FIG. 14a show clamp 112 which is held secure by lock 113 which is held by pin 129.

FIG. 15 has parts needed to connect the invention for the transfer of waste liquid. Mentioned previously part 204 is a commercially available hollow rigid plastic cylinder at certain diameters, which, using ring clamp 206 and bolt 207, can be connected to stem portion 111 or flexible tube portion 303 or neck tube portion 203, as seen in FIGS. 13, 16a and 17a. FIG. 15 also shows commercially available part 139 which seals itself to hollow rigid plastic cylinder 204 by ears 140 twisting over protruding pins 208 on part 204. All of these parts are standard commercially available RV parts bought over the counter.

FIGS. 16 shows another embodiment with a container 300 including an opening 301 which can be closed with cap 302. FIG. 16a shows an exploded view of coupling 201 shown in FIGS. 13, 13a, 15, and 16. The coupling arrangement 201 forms a connection to a commercially available waste hose that would be connected to element 204. The container 300 has a flexible tube portion 303. A relatively stiff cylindrical element 204 engages the center of the tube portion 303. Ring clamp 206 is a commercially available clamp such as that used for automobile hoses and can be tightened with a bolt 207. Tightening clamp 206 prevents liquid leaks between the tube portion 303 and element 204. The tank 300 is a washable and reusable container. Utilizing a clean out opening 301 and removing cap 302 the container 300 is capable of being cleaned out. More preferably, container 300 is manufactured from durable low cost vinyl similar to pool liners and made specifically with a reduced opening to minimize the "bunching" of the bag material to accommodate the element 204.

FIGS. 17 and 17a show another embodiment with a container 200. The coupling arrangement shown is similar to the couplings shown in FIG. 16 and FIG. 16a. A vinyl ring 209 is added for the support and sealing of the neck tube portion 203 and to accommodate a thinner material used for container 200. Use of vinyl ring 209 assures that tube portion 203 is not torn by the tightening of clamp 206. Container 200 is preferably a commercially available disposable bag such as a garbage bag, so that the clean out of container 200 is unnecessary. Similar to container 300, container 200 is manufactured specifically with a reduced opening to minimize the "bunching" of the bag material to accommodate the element 204, thereby further reducing the cost of use of the system with a relatively low added cost for the bags with the reduced opening diameter.

FIGS. 18, 18a, 18b, and 18c show an advantageous coupling arrangement 400, which provides a reduction of diameter and does the reduction with an offset. This arrangement is particularly suitable for the use of a disposable bag specifically manufactured for this application or commercially available garbage bag for container 401 so that the bunching of the bag opening need not be to the small diameter of the standard pipe supplying the waste water. A cylinder 402 is used for the connection to the end portion 403 of the container 401. The end portion 403 passes through a tapered cylinder clamp 402 and engages the tapered end portion of offset transition 404. Clamp 402 is then secured with elastic cords 406 to prevent any liquid leak. Tube end 405 of 404 is attached to commercially available RV hoses.

Figure 19:
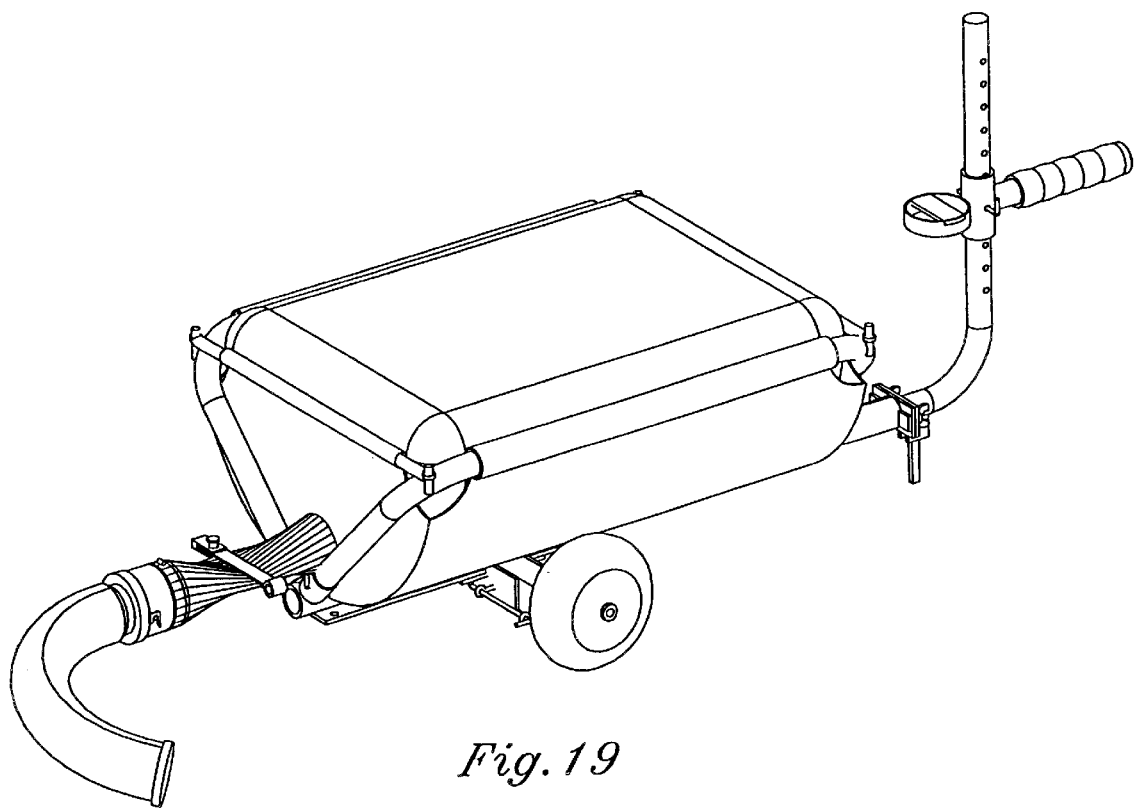
FIG. 19 shows a perspective view of one embodiment of the invention with an unfolded hose.

FIG. 19 shows embodiment of invention with outstretched hoses and clamping device attached to container neck. Without restraint cord shown in FIG. 2.

Maintenance of the operation of the system is extremely simple at a very low cost compared to the prior art.

There has been described a novel system. It is evident that those skilled in the art may now make numerous uses and modifications of and departures from the specific embodiments described herein without departing from the inventive concepts. Consequently, the invention is to be construed as embracing each and every feature and novel combination of features present or possessed by the system herein disclosed and limited solely by the spirit and scope of the appended claims.

What is claimed is:

1. A waste water disposal system, comprising a frame including relatively rigid outer portions and a flexible portion generally extending between the outer portions; a pair of wheels rotatably mounted on said frame and operable for moving said frame by rolling the frame on said wheels; a flexible and collapsible container positioned on said flexible portion and having an opening for receiving waste water; a hose connected to the opening of said container for receiving the waste water; whereby said flexible and collapsible container expands as waste water fills said container; and attaching means operable for connecting said wheels detachably to said frame in an arrangement in which the center of gravity of the frame and flexible portion combined is positioned lower than a coaxial line defined by the centers of said wheels; said frame comprising rotatable sections enabling said frame to be folded to minimize the space it would occupy, whereby said system can be folded and stored conveniently.

2. The waste water disposal system as claimed in claim 1, further comprising a transition means operable for providing a transition from said container to a relatively rigid cylindrical portion.

3. The waste disposal system as claimed in claim 2, wherein said transition means comprises a relatively rigid cylindrical section adapted to engage the opening of said container and a clamping means for retaining said opening of said container in engagement with said cylindrical section.

4. The waste disposal system as claimed in claim 3, wherein said cylindrical section has a larger diameter at one end than the other end; said larger end being connected to said opening in said container.

5. The waste disposal system as claimed in claim 3, wherein said cylindrical section has a larger diameter at one end than the other end and the center of the larger end is displaced relative the center of the smaller end; said larger end being connected to said opening in said container.

6. The waste disposal system as claimed in claim 2, wherein said transition means comprises a first cylindrical portion adapted to have the open end of said container pass through the center and be folded back over the outside surface of said cylindrical portion; and second cylindrical portion adapted to engage said first cylindrical portion to provide a path for waste water to enter said container.

7. The waste disposal system as claimed in claim 6, wherein said first and second cylindrical portions connect together.

8. A waste water disposal system, comprising a frame including relatively rigid outer portions and a flexible portion generally extending between the outer portions; a pair of wheels rotatably mounted on a wheel support connected to said frame and operable for moving said frame by rolling the frame on said wheels; a flexible and collapsible container positioned on said flexible portion and having an opening for receiving waste water; a hose connected to the opening of said container for receiving the waste water; whereby said flexible and collapsible container expands as waste water fills said container; attaching means operable for connecting said wheels detachably to said frame in an arrangement in which the center of gravity of the frame and flexible portion combined is positioned lower than a coaxial line defined by the centers of said wheels; said system further comprising an adjusting means for selectively positioning said wheel support longitudinally along said frame; said adjusting means including a locking means for securing said wheel support in a predetermined position; and said frame comprising rotatable sections enabling said frame to be folded to minimize the space it would occupy, whereby said system can be folded and stored conveniently.

9. The waste disposal system as claimed in claim 8, wherein said adjusting means further comprising positioning a first plate which is connected to said frame, between second and third plates which are connected to said wheel support, said first, second, and third plates respectively having a first, second, third plurality of holes and said second plate is above said third plate and the distance between said second plate and said third plate is dimensioned to allow at least the positioning of said first plate between said second and said third plates; at least some of the holes in said second plurality of holes aligned with some of the holes in said third plurality of holes; said locking means allowing said first plate to align one hole from said first plurality of holes with one hole from each of said second and third pluralities of holes to create a set of aligned holes, and including pin means dimensioned to penetrate said first, second and third plates through said set of aligned holes, and secure said set of aligned holes to inhibit movement of said first plate relative to said second and third plates.

* * * * *